United States Patent
Hellrung (10) Patent No.: US 9,296,315 B2
(45) Date of Patent: Mar. 29, 2016

(54) RECLINER MECHANISM WITH BACKDRIVING FEATURE

(71) Applicant: FISHER & COMPANY, INCORPORATED, St. Clair Shores, MI (US)

(72) Inventor: Jacob P. Hellrung, Grosse Pointe Farms, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 48 days.

(21) Appl. No.: 14/186,303

(22) Filed: Feb. 21, 2014

(65) Prior Publication Data

US 2014/0239691 A1    Aug. 28, 2014

Related U.S. Application Data (60) Provisional application No. 61/769,434, filed on Feb. 26, 2013.

(51) Int. Cl.
*B60N 2/235* (2006.01)

(52) U.S. Cl.
CPC .................................. *B60N 2/2356* (2013.01)

(58) Field of Classification Search
CPC ............................. B60N 2/2356; B60N 2/2358
See application file for complete search history.

(56) References Cited

U.S. PATENT DOCUMENTS

| | | | |
|---|---|---|---|
| 2,941,583 A | 6/1960 | Tischler et al. | |
| 3,557,633 A | 1/1971 | Frerichs | |
| 3,731,342 A | 5/1973 | Cousin | |
| 3,807,797 A | 4/1974 | Klingelhofer | |
| 3,879,802 A | 4/1975 | Werner | |
| 3,958,828 A | 5/1976 | Ishida et al. | |
| 4,076,309 A | 2/1978 | Chekirda et al. | |

(Continued)

FOREIGN PATENT DOCUMENTS

| | | |
|---|---|---|
| CN | 1406788 A | 4/2003 |
| CN | 100480091 C | 7/2006 |

(Continued)

OTHER PUBLICATIONS

International Search Report for International Application No. PCT/US09/33067, dated Feb. 29, 2012.

(Continued)

*Primary Examiner* — Philip Gabler (74) *Attorney, Agent, or Firm* — Harness, Dickey & Pierce, P.L.C.

(57) ABSTRACT

An adjustment mechanism includes a first plate, a second plate having first teeth, and a locking mechanism including a pawl having a post and second teeth. The pawl is movable between a locked position, an unlocked position, and an intermediate position between the locked position and the unlocked position. The second teeth are in engagement with the first teeth when the pawl is in the locked position and are disengaged from the first teeth in the unlocked position and in the intermediate position. A cam is rotatably supported between the plates and moves the pawl between the locked position, the unlocked position, and the intermediate position. A control ring has an inner surface that slidably receives the post when the pawl is in the unlocked position and a recess that receives the post when the pawl is in the locked position or the intermediate position.

6 Claims, 5 Drawing Sheets

(56) References Cited

U.S. PATENT DOCUMENTS

| | | |
|---|---|---|
| 4,082,352 A | 4/1978 | Bales et al. |
| 4,087,885 A | 5/1978 | Gillentine |
| 4,103,970 A | 8/1978 | Homier |
| 4,143,905 A | 3/1979 | Hensel et al. |
| 4,345,792 A | 8/1982 | Shephard |
| 4,348,050 A | 9/1982 | Letournoux et al. |
| 4,457,556 A | 7/1984 | Klingelhofer |
| 4,634,181 A | 1/1987 | Pipon |
| 4,770,464 A | 9/1988 | Pipon et al. |
| 4,813,853 A | 3/1989 | Otto et al. |
| 4,836,606 A | 6/1989 | Werner |
| 4,854,191 A | 8/1989 | Nagano |
| 4,997,223 A | 3/1991 | Croft |
| 5,161,856 A | 11/1992 | Nishino |
| 5,216,936 A | 6/1993 | Baloche |
| 5,267,918 A | 12/1993 | Shiroyama |
| 5,451,096 A | 9/1995 | Droulon |
| 5,531,504 A | 7/1996 | Schmale et al. |
| 5,590,931 A | 1/1997 | Fourrey et al. |
| 5,611,599 A | 3/1997 | Baloche et al. |
| 5,622,407 A | 4/1997 | Yamada et al. |
| 5,681,086 A | 10/1997 | Baloche |
| 5,685,611 A | 11/1997 | Eguchi et al. |
| 5,692,589 A | 12/1997 | Beguin |
| 5,718,483 A | 2/1998 | Yamaguchi et al. |
| 5,749,624 A | 5/1998 | Yoshida |
| 5,755,491 A | 5/1998 | Baloche et al. |
| 5,762,400 A | 6/1998 | Okazaki et al. |
| 5,769,494 A | 6/1998 | Barrere et al. |
| 5,779,313 A | 7/1998 | Rohee |
| 5,785,386 A | 7/1998 | Yoshida |
| 5,788,325 A | 8/1998 | Ganot |
| 5,816,656 A | 10/1998 | Hoshihara et al. |
| 5,820,219 A | 10/1998 | Rohee |
| 5,871,414 A | 2/1999 | Voss et al. |
| 5,873,630 A | 2/1999 | Yoshida et al. |
| 5,881,854 A | 3/1999 | Rougnon-Glasson |
| 5,884,972 A | 3/1999 | Deptolla |
| 5,984,413 A | 11/1999 | Baloche et al. |
| 6,007,152 A | 12/1999 | Kojima et al. |
| 6,007,153 A | 12/1999 | Benoit et al. |
| 6,010,191 A | 1/2000 | Calinaud et al. |
| 6,023,994 A | 2/2000 | Yoshida |
| 6,024,410 A | 2/2000 | Yoshida |
| 6,039,400 A | 3/2000 | Yoshida et al. |
| 6,082,821 A | 7/2000 | Baloche et al. |
| 6,085,386 A | 7/2000 | Blanchard et al. |
| 6,092,874 A | 7/2000 | Kojima et al. |
| 6,095,608 A | 8/2000 | Ganot et al. |
| 6,102,480 A | 8/2000 | Asano |
| 6,112,370 A | 9/2000 | Blanchard et al. |
| 6,120,098 A | 9/2000 | Magyar et al. |
| 6,142,569 A | 11/2000 | Kidokoro et al. |
| 6,149,235 A | 11/2000 | Fahim |
| 6,164,723 A | 12/2000 | Ganot |
| 6,224,157 B1 | 5/2001 | Di Luccio |
| 6,253,894 B1 | 7/2001 | Schumann et al. |
| 6,296,311 B1 | 10/2001 | Bonk et al. |
| 6,312,053 B1 | 11/2001 | Magyar |
| 6,318,805 B1 | 11/2001 | Asano |
| 6,325,457 B1 | 12/2001 | Matsumoto et al. |
| 6,325,458 B1 | 12/2001 | Rohee et al. |
| 6,328,382 B1 | 12/2001 | Yamashita |
| 6,328,383 B2 | 12/2001 | Rohee et al. |
| 6,332,649 B1 | 12/2001 | Vossmann |
| 6,364,413 B1 | 4/2002 | Rohee et al. |
| 6,390,557 B1 | 5/2002 | Asano |
| 6,402,249 B1 | 6/2002 | Rohee et al. |
| 6,439,663 B1 | 8/2002 | Ikegaya |
| 6,454,354 B1 | 9/2002 | Vossmann et al. |
| 6,464,298 B1 | 10/2002 | Hansel et al. |
| 6,474,734 B1 | 11/2002 | Masuda et al. |
| 6,474,740 B1 | 11/2002 | Kondo et al. |
| 6,520,583 B1 | 2/2003 | Bonk |
| 6,554,361 B2 | 4/2003 | Reubeuze et al. |
| 6,561,585 B2 | 5/2003 | Cilliere et al. |
| 6,568,759 B1 | 5/2003 | Hochmuth |
| 6,575,278 B1 | 6/2003 | Schumann et al. |
| 6,609,756 B2 | 8/2003 | Kojima et al. |
| 6,609,758 B1 | 8/2003 | Lefevere |
| 6,619,744 B2 | 9/2003 | Reubeuze |
| 6,626,495 B2 | 9/2003 | Okazaki et al. |
| 6,629,733 B2 | 10/2003 | Matsuura et al. |
| 6,634,713 B2 | 10/2003 | Nonomiya et al. |
| 6,640,952 B2 | 11/2003 | Baloche et al. |
| 6,641,217 B2 | 11/2003 | Yamada et al. |
| 6,648,414 B2 | 11/2003 | Ikegaya et al. |
| 6,666,515 B2 | 12/2003 | Asano et al. |
| 6,669,296 B2 | 12/2003 | Moriyama et al. |
| 6,669,297 B2 | 12/2003 | Cilliere et al. |
| 6,675,945 B2 | 1/2004 | Kim |
| 6,676,217 B2 | 1/2004 | Lange |
| 6,695,405 B2 | 2/2004 | Senseby et al. |
| 6,715,835 B2 | 4/2004 | Hoshihara et al. |
| 6,722,738 B2 | 4/2004 | Uramichi |
| 6,726,281 B2 | 4/2004 | Baloche |
| 6,733,077 B2 | 5/2004 | Asano |
| 6,742,844 B2 | 6/2004 | Pollack |
| 6,749,263 B2 | 6/2004 | Peters |
| 6,755,471 B2 | 6/2004 | Hoshihara et al. |
| 6,758,524 B2 | 7/2004 | Kisiel |
| 6,758,525 B2 | 7/2004 | Uramichi |
| 6,769,740 B2 | 8/2004 | Yamada |
| 6,786,550 B2 | 9/2004 | Uramichi |
| 6,799,806 B2 | 10/2004 | Eppert et al. |
| 6,820,937 B1 | 11/2004 | Esaki et al. |
| 6,824,216 B2 | 11/2004 | Uramichi |
| 6,843,533 B1 | 1/2005 | Miyata et al. |
| 6,854,802 B2 | 2/2005 | Matsuura et al. |
| 6,880,887 B2 | 4/2005 | Hoshihara et al. |
| 6,883,869 B2 | 4/2005 | Liu et al. |
| 6,890,034 B2 | 5/2005 | Bonk |
| 6,908,156 B1 | 6/2005 | Park et al. |
| 6,910,737 B2 | 6/2005 | Hosokawa |
| 6,910,738 B2 | 6/2005 | Bonk |
| 6,923,504 B1 | 8/2005 | Liu et al. |
| 6,991,294 B2 | 1/2006 | Choi |
| 6,991,295 B2 | 1/2006 | Peters |
| 7,021,714 B2 | 4/2006 | Oki et al. |
| 7,021,715 B2 | 4/2006 | Umezaki |
| 7,055,906 B2 | 6/2006 | Shinozaki |
| 7,066,541 B2 | 6/2006 | Uramichi |
| 7,097,251 B2 | 8/2006 | Uramichi |
| 7,097,253 B2 | 8/2006 | Coughlin et al. |
| 7,100,986 B2 | 9/2006 | Uramichi et al. |
| 7,100,987 B2 | 9/2006 | Volker et al. |
| 7,114,778 B2 | 10/2006 | Schuler et al. |
| 7,140,686 B2 | 11/2006 | Rohee |
| 7,144,082 B2 | 12/2006 | Ohba |
| 7,150,503 B2 | 12/2006 | Ohba |
| 7,159,945 B2 | 1/2007 | Eppert |
| 7,165,813 B2 | 1/2007 | Tame |
| 7,168,764 B2 | 1/2007 | Reubeuze et al. |
| 7,188,905 B2 | 3/2007 | Ham |
| 7,195,318 B2 | 3/2007 | Cha et al. |
| 7,201,447 B2 | 4/2007 | Yamada |
| 7,204,555 B2 | 4/2007 | Thiel |
| 7,222,916 B2 | 5/2007 | De Wilde et al. |
| 7,222,919 B2 | 5/2007 | Uramichi et al. |
| 7,261,379 B2 | 8/2007 | Volker et al. |
| 7,303,499 B2 | 12/2007 | Klindworth |
| 7,334,843 B2 | 2/2008 | Yamada et al. |
| 7,341,311 B2 | 3/2008 | Ohba |
| 7,354,109 B2 | 4/2008 | Oki |
| 7,360,838 B2 | 4/2008 | Smuk |
| 7,380,882 B2 | 6/2008 | Oki |
| 7,380,883 B2 | 6/2008 | Koumura |
| 7,404,604 B2 | 7/2008 | Nag et al. |
| 7,407,230 B1 | 8/2008 | Luo et al. |
| 7,416,255 B2 | 8/2008 | Yamada et al. |
| 7,441,840 B2 | 10/2008 | Yamada et al. |
| 7,458,639 B2 | 12/2008 | Thiel et al. |
| 7,461,898 B2 | 12/2008 | Kojima |
| 7,475,945 B2 | 1/2009 | Reubeuze et al. |

(56) References Cited

U.S. PATENT DOCUMENTS

| | | |
|---|---|---|
| 7,478,881 B2 | 1/2009 | Leconte |
| 7,517,021 B2 | 4/2009 | Wahls et al. |
| 7,552,971 B1 | 6/2009 | Tarusawa et al. |
| 7,563,049 B2 | 7/2009 | Peters |
| 7,571,963 B2 | 8/2009 | Peters et al. |
| 7,578,556 B2 | 8/2009 | Ohba et al. |
| 7,588,294 B2 | 9/2009 | Matsumoto et al. |
| 7,614,700 B2 | 11/2009 | Peters |
| 7,648,204 B2 | 1/2010 | Oki |
| 7,669,931 B2 | 3/2010 | Tarusawa et al. |
| 7,677,667 B2 | 3/2010 | Peters et al. |
| 7,703,852 B2 | 4/2010 | Wahls et al. |
| 7,722,121 B2 | 5/2010 | Fujioka et al. |
| 8,128,170 B2 | 3/2012 | Cha et al. |
| 2002/0024246 A1 | 2/2002 | Yamada et al. |
| 2002/0033627 A1 | 3/2002 | Hoshihara et al. |
| 2002/0041119 A1 | 4/2002 | Kojima et al. |
| 2002/0043852 A1 | 4/2002 | Uramichi |
| 2002/0043856 A1 | 4/2002 | Ikegaya |
| 2002/0096922 A1 | 7/2002 | Villaroel et al. |
| 2002/0096923 A1 | 7/2002 | Uramichi |
| 2002/0096924 A1 | 7/2002 | Reubeuze |
| 2002/0096925 A1 | 7/2002 | Uramichi |
| 2002/0125756 A1 | 9/2002 | Asano |
| 2002/0171280 A1 | 11/2002 | Okazaki et al. |
| 2003/0025376 A1 | 2/2003 | Moriyama et al. |
| 2003/0067205 A1 | 4/2003 | Eppert et al. |
| 2003/0085603 A1 | 5/2003 | Lee et al. |
| 2003/0155800 A1 | 8/2003 | Asano |
| 2003/0173810 A1 | 9/2003 | Lee et al. |
| 2003/0178879 A1 | 9/2003 | Uramichi |
| 2003/0214165 A1 | 11/2003 | Finner et al. |
| 2003/0230923 A1 | 12/2003 | Uramichi |
| 2004/0036337 A1 | 2/2004 | Hoshihara et al. |
| 2004/0036338 A1 | 2/2004 | Lardais et al. |
| 2004/0084945 A1 | 5/2004 | Toba et al. |
| 2004/0145226 A1 | 7/2004 | Bonk |
| 2004/0145227 A1 | 7/2004 | Bonk |
| 2004/0195890 A1 | 10/2004 | Liu et al. |
| 2005/0035640 A1 | 2/2005 | Shinozaki |
| 2005/0073185 A1 | 4/2005 | Uramichi |
| 2005/0082892 A1 | 4/2005 | Yamada et al. |
| 2005/0140196 A1 | 6/2005 | Park et al. |
| 2005/0146187 A1 | 7/2005 | Volker et al. |
| 2005/0156454 A1 | 7/2005 | Fast |
| 2005/0168034 A1 | 8/2005 | Fast |
| 2005/0231016 A1 | 10/2005 | Kojima |
| 2005/0264076 A1 | 12/2005 | Uramichi et al. |
| 2005/0275270 A1 | 12/2005 | Lee |
| 2006/0012232 A1 | 1/2006 | Coughlin et al. |
| 2006/0055222 A1 | 3/2006 | Bonk et al. |
| 2006/0145523 A1 | 7/2006 | Yamada |
| 2006/0170269 A1 | 8/2006 | Oki |
| 2006/0261657 A1 | 11/2006 | Luo et al. |
| 2007/0024099 A1 | 2/2007 | Becker et al. |
| 2007/0040436 A1 | 2/2007 | Oki |
| 2007/0040437 A1 | 2/2007 | Nagura et al. |
| 2007/0057558 A1 | 3/2007 | Kojima |
| 2007/0096529 A1 | 5/2007 | Kojima et al. |
| 2007/0102982 A1 | 5/2007 | Yamada et al. |
| 2007/0108825 A1 | 5/2007 | Yamada et al. |
| 2007/0132294 A1 | 6/2007 | Yamada et al. |
| 2007/0145800 A1 | 6/2007 | Thiel et al. |
| 2007/0145801 A1 | 6/2007 | Yamada et al. |
| 2007/0289092 A1 | 12/2007 | Rohee et al. |
| 2008/0001458 A1 | 1/2008 | Hoshihara et al. |
| 2008/0048478 A1 | 2/2008 | Koumura |
| 2008/0073961 A1 | 3/2008 | Wahls et al. |
| 2008/0093906 A1 | 4/2008 | Gruson |
| 2008/0093907 A1 | 4/2008 | Nag et al. |
| 2008/0174163 A1 | 7/2008 | Kojima et al. |
| 2008/0197687 A1 | 8/2008 | Luo et al. |
| 2008/0203798 A1 | 8/2008 | Kienke et al. |
| 2008/0203799 A1 | 8/2008 | Yamada |
| 2008/0211285 A1 | 9/2008 | Ishihara et al. |
| 2008/0231103 A1 | 9/2008 | Rohee |
| 2008/0238171 A1 | 10/2008 | Kojima et al. |
| 2008/0303331 A1 | 12/2008 | Heo |
| 2009/0066138 A1 | 3/2009 | Reubeuze et al. |
| 2009/0085391 A1 | 4/2009 | Peters et al. |
| 2009/0200850 A1 | 8/2009 | Heo |
| 2009/0236892 A1 | 9/2009 | Cillierre et al. |
| 2009/0243360 A1 | 10/2009 | Tarusawa et al. |
| 2009/0243361 A1 | 10/2009 | Tarusawa et al. |
| 2009/0243363 A1 | 10/2009 | Tarusawa et al. |
| 2009/0302658 A1 | 12/2009 | Fassbender et al. |
| 2010/0026071 A1 | 2/2010 | Ohba |
| 2010/0033004 A1 | 2/2010 | Reubeuze |
| 2010/0109408 A1 | 5/2010 | Ohba |
| 2010/0139425 A1 | 6/2010 | Schulz et al. |
| 2010/0194164 A1 | 8/2010 | Cha et al. |
| 2010/0194165 A1 | 8/2010 | Iguchi |
| 2011/0025114 A1* | 2/2011 | Berndtson et al. ......... 297/367 P |

FOREIGN PATENT DOCUMENTS

| | | |
|---|---|---|
| DE | 19814225 A1 | 10/1998 |
| DE | 19918864 A1 | 10/1999 |
| DE | 19904300 C1 | 8/2000 |
| DE | 10105282 A1 | 8/2002 |
| DE | 10305407 A1 | 8/2004 |
| EP | 0694434 A1 | 1/1996 |
| EP | 1676502 A2 | 7/2006 |
| GB | 2449383 A | 11/2008 |
| JP | 2002-119349 A | 4/2002 |
| JP | 2002119352 A | 4/2002 |
| JP | 2003000379 A | 1/2003 |
| JP | 2004081345 A | 3/2004 |
| JP | 2004245942 A | 9/2004 |
| JP | 2005304717 A | 11/2005 |
| JP | 2006014999 A | 1/2006 |
| JP | 2004379630 | 4/2008 |
| WO | 0279000 A1 | 10/2002 |
| WO | 2007/034683 A1 | 3/2007 |
| WO | 2007115601 A1 | 10/2007 |
| WO | 2008046004 A1 | 4/2008 |
| WO | 2010048383 A1 | 4/2010 |

OTHER PUBLICATIONS

Written Opinion of the International Searching Authority for International Application No. PCT/US09/33067, dated Feb. 29, 2012.

International Search Report and Written Opinion of the International Searching Authority for International Application No. PCT/US09/31255, dated Feb. 23, 2009.

First Office Action regarding Chinese Patent Application No. 200980103781.4, dated Mar. 7, 2012. English translation provided by AIPT Patent Trademark & Law Office.

First Office Action for Chinese Application No. 200980102127.1, mailed Sep. 13, 2012. English translation provided by AIPT Patent, Trademark & Law Office.

Notification of Reason(s) for Refusal for Japanese Patent Application No. 2010-543276, dated Sep. 5, 2012. English translation provided by Maeda & Suzuki.

Non-Final Office Action in U.S. Appl. No. 13/099,594, mailed Oct. 24, 2012.

Second Office Action regarding Chinese Patent Application No. 200980103781.4, dated Jan. 28, 2013. Eglish translation provided by AIPT Patent Trademark & Law Office.

Second Office Action for Chinese Application No. 200980102127.1, mailed Apr. 15, 2013. English translation provided by AIPT Patent, Trademark & Law Office.

Final Office Action in U.S. Appl. No. 13/099,594, mailed May 7, 2013.

Final Office Action in U.S. Appl. No. 12/855,427, mailed Apr. 3, 2013.

Non-Final Office Action in U.S. Appl. No. 12/855,427, mailed Jul. 12, 2013.

Third Office Action regarding Chinese Patent Application No. 200980103781.4, dated Aug. 13, 2013. English translation provided by AIPT Patent, Trademark & Law Office.

\* cited by examiner

RECLINER MECHANISM WITH BACKDRIVING FEATURE

CROSS-REFERENCE TO RELATED APPLICATIONS

This application claims the benefit of U.S. Provisional Application No. 61/769,434, filed on Feb. 26, 2013. The entire disclosure of the above application is incorporated herein by reference.

FIELD

The present disclosure relates to an adjustment mechanism and more particularly to an adjustment mechanism for use with a seat assembly.

BACKGROUND

This section provides background information related to the present disclosure which is not necessarily prior art.

Seat assemblies such as those used in conjunction with vehicles typically include an adjustment mechanism disposed at a junction of a seatback and a seat bottom of the seat assembly. Locating the adjustment mechanism at a junction of the seatback and the seat bottom provides for selective adjustment of the seatback relative to the seat bottom. Namely, conventional adjustment mechanisms are typically movable between a locked state, restricting movement of the seatback relative to the seat bottom, and an unlocked state permitting movement of the seatback relative to the seat bottom.

A round-recliner mechanism is a type of adjustment mechanism and typically includes a gear plate associated with one of the seat bottom and the seatback, a guide plate associated with the other of the seat bottom and the seatback, a locking mechanism disposed between and supported by the gear plate and the guide plate, and an actuation mechanism that selectively moves the locking mechanism between a locked state and an unlocked state. When the locking mechanism is in the locked state, relative rotation between the gear plate and the guide plate is restricted and, as a result, rotation of the seatback relative to the seat bottom is likewise restricted. When the locking mechanism is in the unlocked state, relative rotation between the gear plate and the guide plate is permitted and, as a result, rotation of the seatback relative to the seat bottom is likewise permitted.

The locking mechanism associated with the round-recliner mechanism may include one or more pawls having a series of teeth that are in meshed engagement with teeth of the gear plate when the locking mechanism is in the locked state. The pawls may be movable between the locked state and the unlocked state by the actuation mechanism. In one configuration, the actuation mechanism may include a cam that urges the pawls into the locked state when rotated in a first direction and moves the pawls into the unlocked state when rotated in a second, opposite direction.

While the actuation mechanism adequately moves the pawls of the locking mechanism from the unlocked state to the locked state, if a force is applied to the seatback too quickly following movement of the pawls from the locked state to the unlocked state, a force may be applied to one or more of the pawls via a control ring fixed for movement with the gear plate. The force applied to the pawl(s) via the control ring may cause damage to post(s) associated with and extending from the pawl(s). Specifically, if the force exceeds a predetermined limit, the post(s) may be sheared from one or more of the pawls, thereby preventing the pawls from interacting with the control ring during operation of the round-recliner mechanism.

SUMMARY

This section provides a general summary of the disclosure, and is not a comprehensive disclosure of its full scope or all of its features.

An adjustment mechanism is provided and includes a first plate, a second plate rotatably attached to the first plate and including a first series of teeth, and a locking mechanism operably supported by at least one of the first plate and the second plate and including a pawl having a post and a second series of teeth. The pawl is movable between a locked position, an unlocked position, and an intermediate position between the locked position and the unlocked position. The second series teeth are in meshed engagement with the first series of teeth when the pawl is in the locked position to restrict relative rotation between the first plate and the second plate and are disengaged from the first series of teeth in the unlocked position and in the intermediate position to permit relative rotation between the first plate and the second plate. The adjustment mechanism further includes a cam rotatably supported between the first plate and the second plate that moves the pawl between the locked position, the unlocked position, and the intermediate position and a control ring having an inner surface slidably receiving the post when the pawl is in the unlocked position and a recess receiving the post when the pawl is in the locked position and when the pawl is in the intermediate position.

In another configuration, an adjustment mechanism is provided and includes a first plate, a second plate rotatably attached to the first plate and including a first series of teeth, and a locking mechanism operably supported by at least one of the first plate and the second plate and including a pawl having a post and a second series of teeth. The pawl is movable between a locked position, an unlocked position, and an intermediate position between the locked position and the unlocked position. The second series teeth are in meshed engagement with the first series of teeth when the pawl is in the locked position to restrict relative rotation between the first plate and the second plate and are disengaged from the first series of teeth in the unlocked position and in the intermediate position to permit relative rotation between the first plate and the second plate. The adjustment mechanism further includes a cam rotatably supported between the first plate and the second plate that moves the pawl between the locked position, the unlocked position, and the intermediate position and a control ring having an inner surface slidably receiving the post when the pawl is in the unlocked position to prevent engagement between the first series of teeth and the second series of teeth. The post is separated from the inner surface when the pawl is in the locked position and when the pawl is in the intermediate position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, an adjustment mechanism 10 is provided and may include a housing 12, a locking mechanism 14, and an actuation mechanism 16. The locking mechanism 14 may be supported by the housing 12 and may be movable between a locked state and an unlocked state by the actuation mechanism 16.

Figure 2:
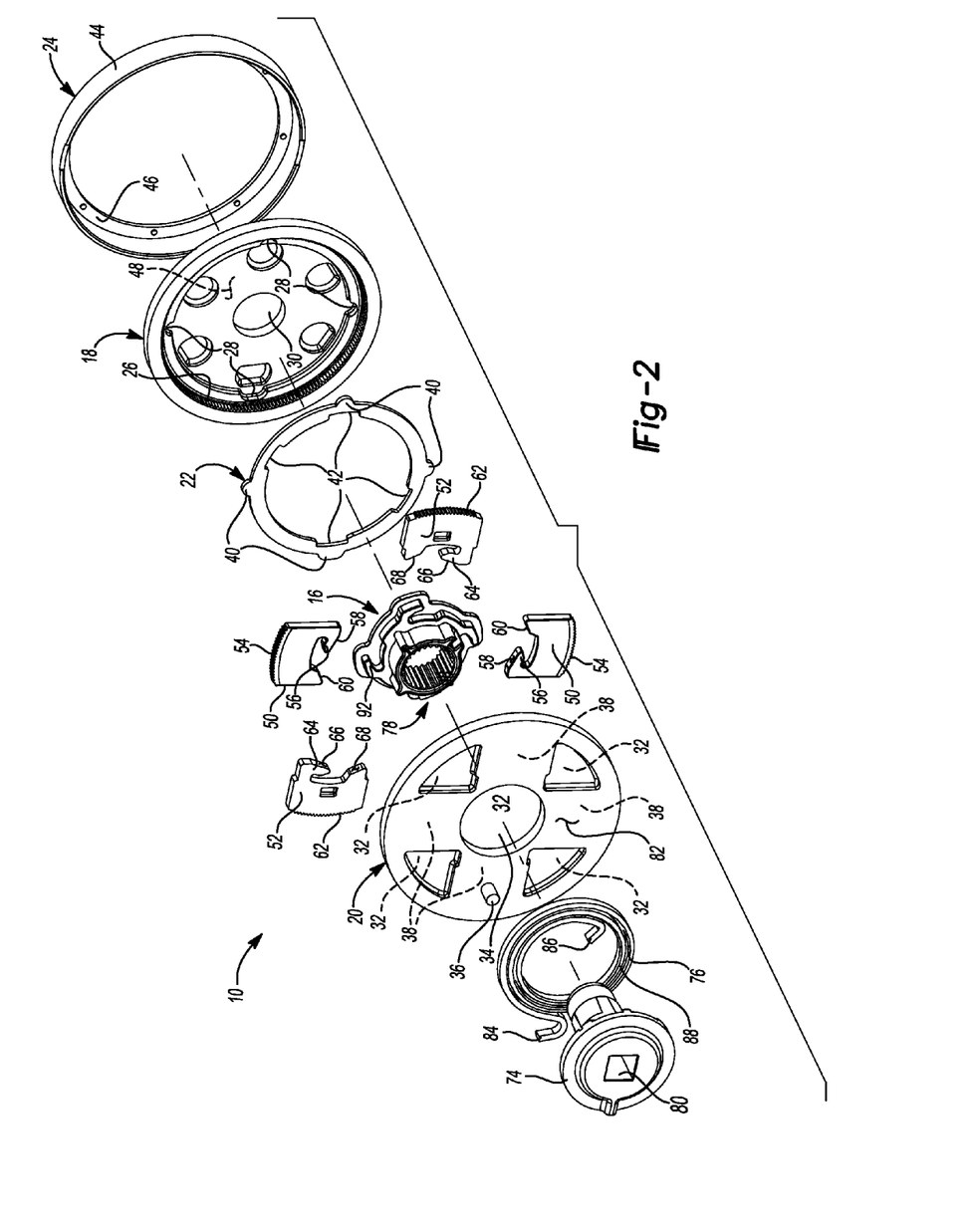
FIG. 2 is an exploded view of the adjustment mechanism of FIG. 1.

The housing 12 may include a gear plate 18, a guide plate 20, a control ring 22, and an encapsulation ring 24. The gear plate 18 may include a series of teeth 26, a series of recesses 28, and a central aperture 30. The teeth 26 may be formed on an inner circumferential surface thereof (FIG. 2) and may interact with the locking mechanism 14 to selectively prevent relative rotation between the gear plate 18 and the guide plate 20. The recesses 28 may be formed around an inner perimeter of the gear plate 18 and may be spaced apart and separated from one another to receive a portion of the control ring 22 therein. The recesses 28 may cooperate with the control ring 22 to fix the control ring 22 for rotation with the gear plate 18, as will be described in greater detail below. The central aperture 30 may be formed through the gear plate 18 and may receive a portion of the actuation mechanism 16 therein.

The guide plate 20 may include a series of projections 32, a central aperture 34, and a spring post 36. The projections 32 may extend from the guide plate 20 and may define a series of channels 38 respectively disposed between a pair of adjacent projections 32. The channels 38 may slideably receive a portion of the locking mechanism 14 to properly position the locking mechanism 14 between the gear plate 18 and the guide plate 20.

The central aperture 34 may be coaxially aligned with an axis of rotation of the guide plate 20 and may be aligned with the central aperture 30 when the gear plate 18 is assembled to the guide plate 20. As with the central aperture 30 of the gear plate 18, the central aperture 34 of the guide plate 20 may receive a portion of the actuation mechanism 16 therein.

The spring post 36 may extend from the guide plate 20 in an opposite direction than the projections 32. As such, the spring post 36 may extend from an opposite side of the guide plate 20 than the projections 32.

The control ring 22 may include a series of projections 40 and a series of recesses 42. The projections 40 may be respectively received within the recesses 28 of the gear plate 18 to fix the control ring 22 for rotation with the gear plate 18. The recesses 42 may be formed on an opposite side of the control ring 22 than the projections 40 such that the recesses 42 are formed in an inner perimeter of the control ring 22. The control ring 22 may work in conjunction with the locking mechanism 14 to permit or restrict movement of the locking mechanism 14 from an unlocked state to a locked state.

The encapsulation ring 24 may include a first flange 44 and a second flange 46. The first flange 44 may be formed substantially ninety degrees (90°) relative to the second flange 46 and may surround an outer perimeter of the gear plate 18 and the guide plate 20 when the gear plate 18 is assembled to the guide plate 20. When the encapsulation ring 24 is assembled to the gear plate 18 and the guide plate 20, the second flange 46 may oppose an outer surface 48 of the gear plate 18.

The locking mechanism 14 may include a first series of pawls 50 and a second series of pawls 52. The first series of pawls 50 may include a series of teeth 54, a hook 56, a first locking surface 58, and a second locking surface 60. Likewise, the second series of pawls 52 may include a series of teeth 62, a hook 64, a first locking surface 66, and a second locking surface 68. The second series of pawls 52 may additionally include a post 70 extending from a surface 72 thereof. The post 70 may interact with the control ring 22 to selectively prevent the actuation mechanism 16 from moving the pawls 50, 52 into engagement with the teeth 26 of the gear plate 18.

The actuation mechanism 16 may include a pivot 74, a biasing member 76, and a cam 78. The pivot 74 may be received by the central aperture 30 of the gear plate 18, may be received by the central aperture 34 of the guide plate 20, and may include a keyed aperture 80 and a spring seat (not shown). The keyed aperture 80 may matingly receive a rod (not shown), for example, that is connected to an actuation handle (not shown) such that when a force is applied to the rod via the actuation handle, the force is likewise applied to the pivot 74, thereby causing the pivot 74 to rotate. The pivot 74 may be fixed for rotation with the cam 78 such that when the pivot 74 is rotated, the cam 78 is rotated therewith.

Figure 1:
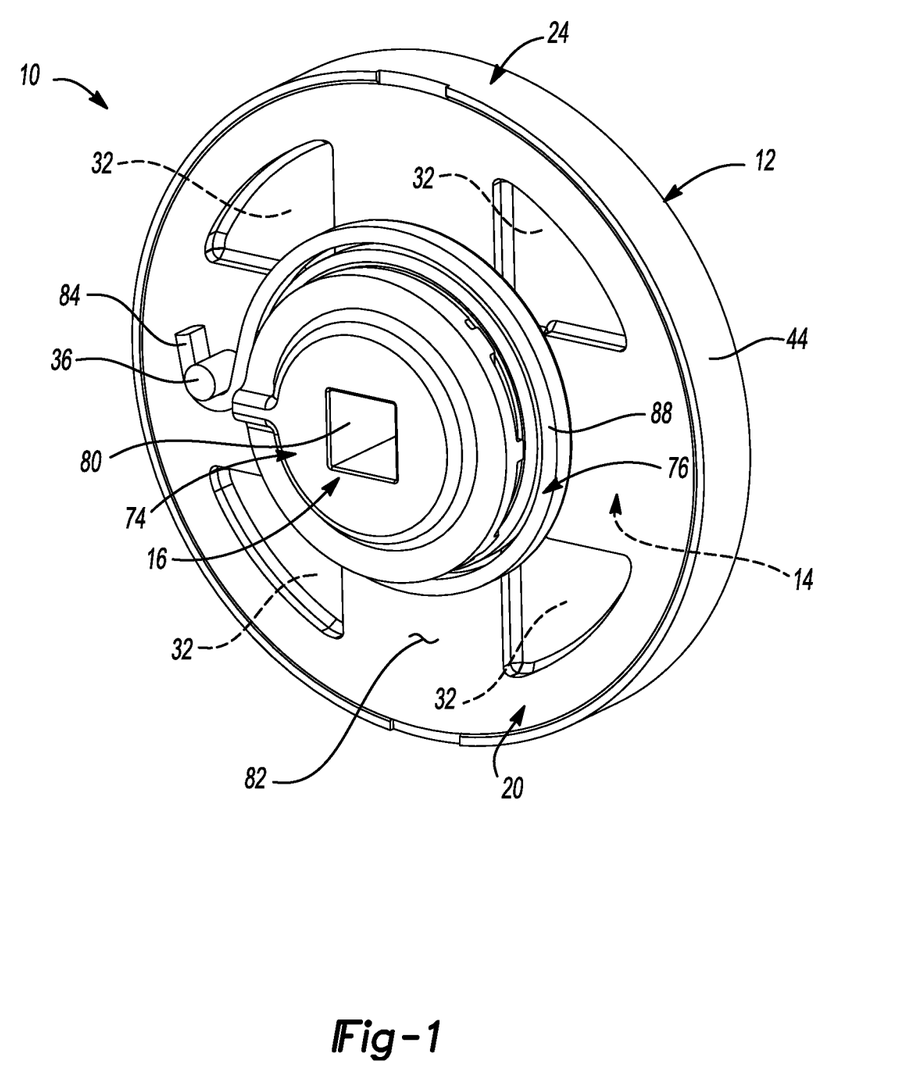
FIG. 1 is a perspective view of an adjustment mechanism in accordance with the principles of the present disclosure.
Figure 5:
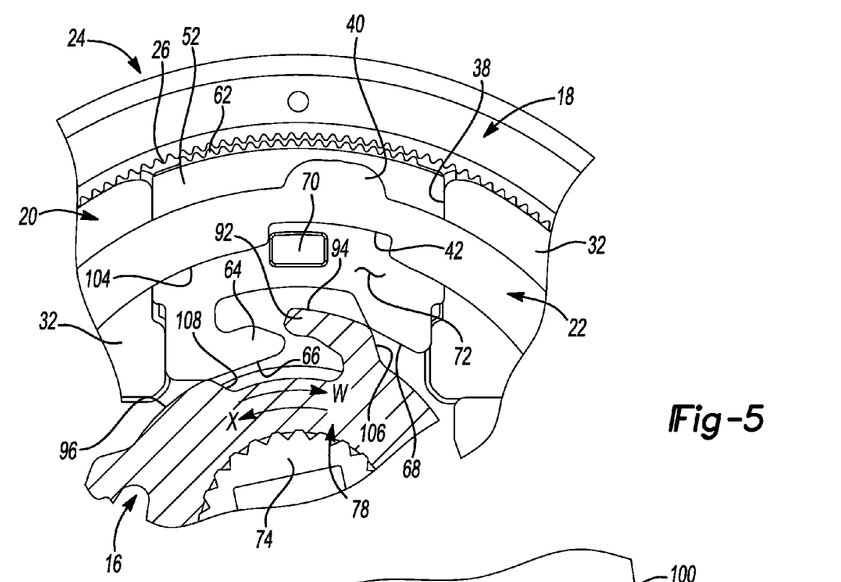
FIG. 5 is a detailed view of a portion of the adjustment mechanism of FIG. 4.

The biasing member 76 may be disposed proximate to an outer surface 82 of the guide plate 20 (FIG. 1) and may include a first end 84, a second end 86, and a coiled body 88. The first end 84 may abut the spring post 36 while the second end 86 may be attached to the spring seat of the pivot 74. Accordingly, the biasing member 76—via the coiled body 88—may exert a rotational force on the pivot 74, thereby biasing the pivot 74 in the direction (W), as shown in FIG. 5. Biasing the pivot 74 in the direction (W) biases the locking mechanism 14 into the locked state, as will be described in greater detail below.

As described above, the cam 78 may be fixed for rotation with the pivot 74 such that when the pivot 74 is rotated relative to the gear plate 18 and the guide plate 20, the cam 78 is likewise rotated relative to the gear plate 18 and the guide plate 20. The cam 78 may include a splined aperture 90 and a series of hooks 92. The splined aperture 90 may receive a portion of the pivot 74 to fix the cam 78 for rotation with the pivot 74 via the splined aperture 90. The hooks 92 may extend from the cam 78 and may each include a first locking surface 94. A second locking surface 96 may be disposed adjacent to but spaced apart from the first locking surface 94. The first locking surface 94 and the second locking surface 96 may respectively engage the second locking surface 60 and the first locking surface 58 of the first series of pawls 50 or may engage the second locking surface 68 and the first locking surface 66, respectively, of the second series of pawls 52 to move the locking mechanism 14 from the unlocked state to the locked state. When the locking mechanism 14 is in the locked state, relative rotation between the gear plate 18 and the guide plate 20 is prohibited.

Figure 6:
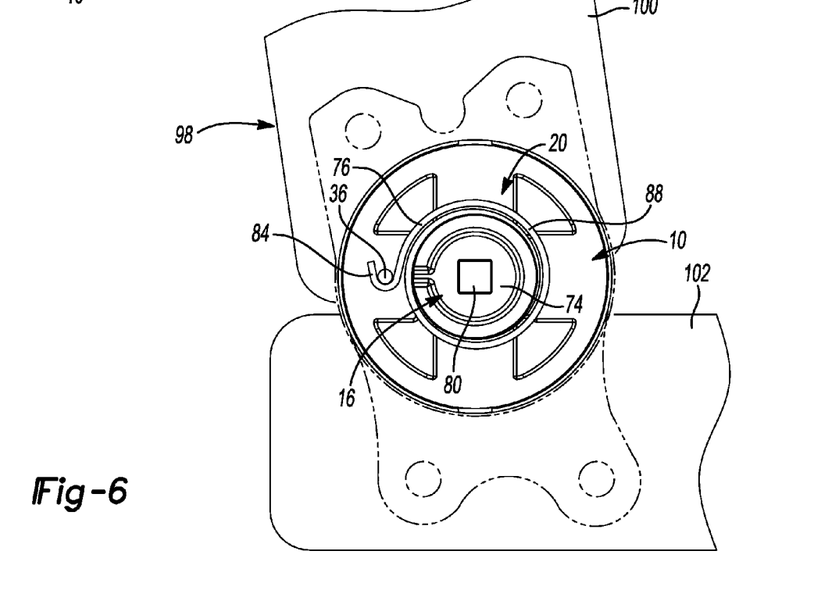
FIG. 6 is a partial side view of a seat assembly incorporating the adjustment mechanism of FIG. 1.

With particular reference to FIG. 6, the adjustment mechanism 10 is shown incorporated into a seat assembly 98 having a seatback 100 and a seat bottom 102. The seatback 100 may be rotatably supported by the seat bottom 102, whereby the adjustment mechanism 10 is disposed proximate to a junction of the seatback 100 and the seat bottom 102. The adjustment mechanism 10 may selectively restrict rotation of the seatback 100 relative to the seat bottom 102 when the locking mechanism 14 is in the locked state and may permit rotation of the seatback 100 relative to the seat bottom 102 when the locking mechanism 14 is in the unlocked state.

In one configuration, the gear plate 18 is fixed for rotation with the seatback 100 while the guide plate 20 is fixed for rotation with the seat bottom 102. While the gear plate 18 may be fixed for rotation with the seatback 100 and the guide plate 20 may be fixed for rotation with the seat bottom 102, the guide plate 20 could alternatively be fixed for rotation with the seatback 100 and the gear plate 18 could alternatively be fixed for rotation with the seat bottom 102. While either of the gear plate 18 and the guide plate 20 could be associated with the seatback 100 and either of the gear plate 18 and the guide plate 20 could be associated with the seat bottom 102, the gear plate 18 will be shown and described hereinafter as being fixed for movement with the seatback 100 and the guide plate 20 will be described and shown as being fixed for rotation with the seat bottom 102.

Figure 3:
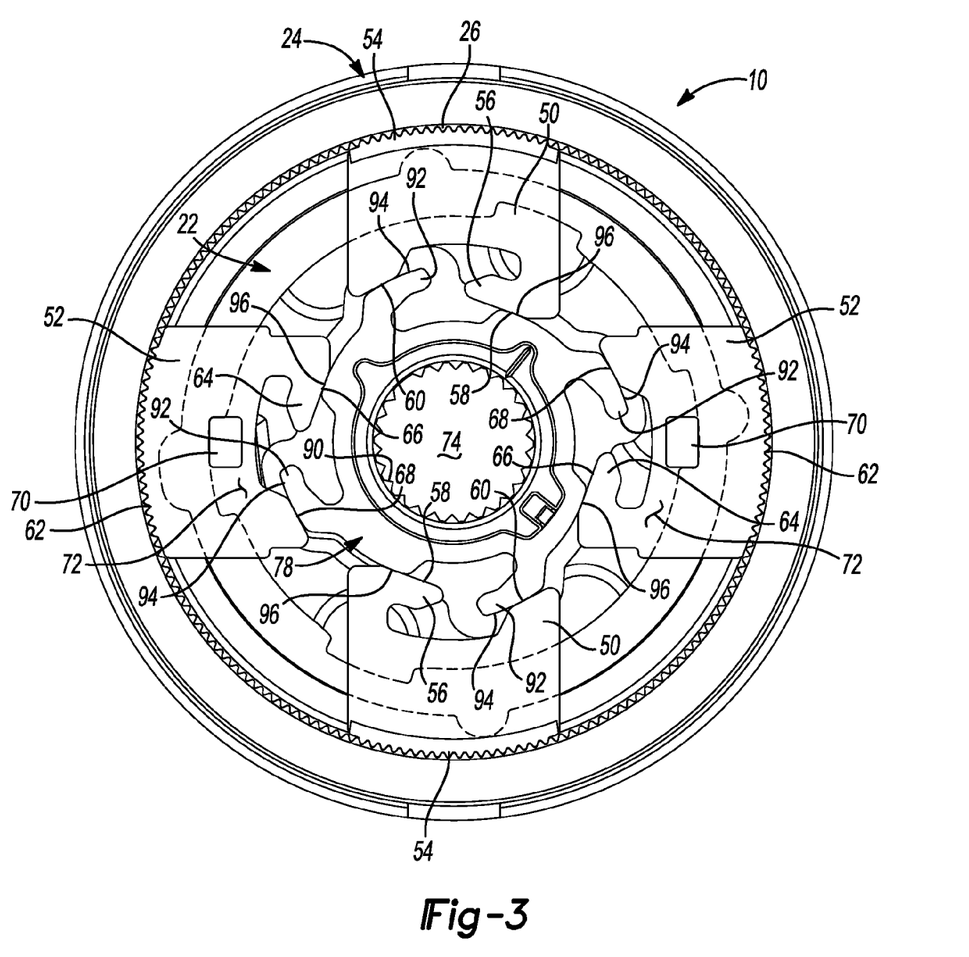
FIG. 3 is a front view of the adjustment mechanism of FIG. 1 with part of a housing removed to show internal components of the adjustment mechanism in a locked state.
Figure 4:
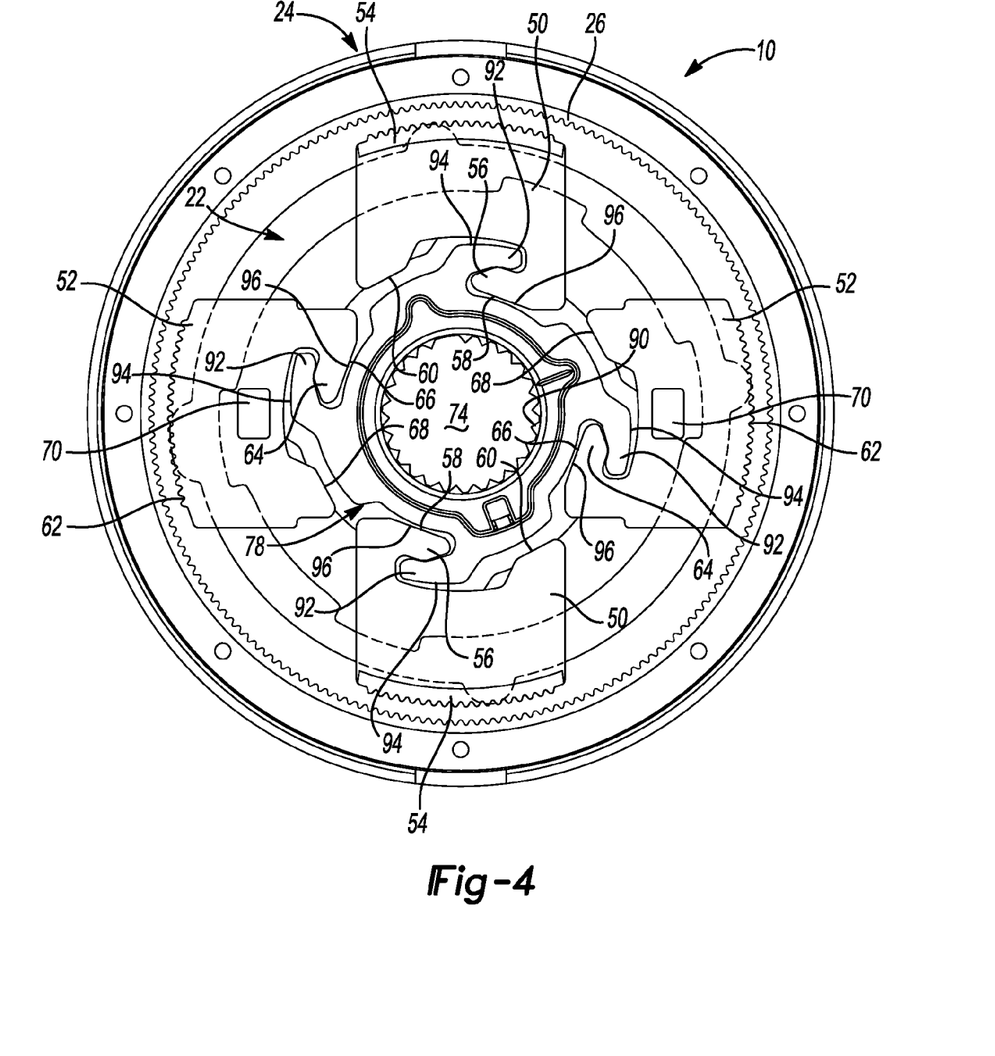
FIG. 4 is a front view of the adjustment mechanism of FIG. 1 with part of a housing removed to show internal components of the adjustment mechanism in an unlocked state.

With particular reference to FIGS. 3-5, operation of the adjustment mechanism 10 will be described in detail. When the adjustment mechanism 10 is at rest, the biasing member 76 may exert a force on the cam 78 via the pivot 74. The force exerted on the cam 78 may be in the direction (W), as shown in FIG. 5, and may cause the cam 78 to urge the pawls 50, 52 into engagement with the gear plate 18. Specifically, the first locking surface 94 of the cam 78 may engage the second locking surfaces 60, 68 of the first series of pawls 50 and the second series of pawls 52, respectively, to urge the pawls 50, 52 into engagement with the gear plate 18. Likewise, the second locking surface 96 may engage the first locking surface 58 of the first series of pawls 50 and may engage the first locking surface 66 of the second series of pawls 52 to urge the pawls 50, 52 into engagement with the gear plate 18.

Engagement between the pawls 50, 52 and the gear plate 18 causes the teeth 54 of the first series of pawls 50 and the teeth 62 of the second series of pawls 52 to engage the teeth 26 of the gear plate 18. Engagement between the teeth 54, 62 of the pawls 50, 52 and the teeth 26 of the gear plate 18 restricts relative rotation between the gear plate 18 and the guide plate 20. Accordingly, rotation of the seatback 100 relative to the seat bottom 102 is likewise restricted.

A force may be applied to the cam 78 against the force of the biasing member 76 by rotating the pivot 74 relative to the gear plate 18 and the guide plate 20. The force applied to the pivot 74 may be in a direction (X), as shown in FIG. 5, which may be in an opposite direction than direction (W). Rotation of the pivot 74 in the direction (X) likewise causes rotation of the cam 78 in the direction (X) due to the cam 78 being fixed for rotation with the pivot 74. Rotation of the cam 78 in the direction (X) causes the first locking surfaces 94 of the cam 78 to disengage the second locking surfaces 60, 68 of the pawls 50, 52 and causes the second locking surface 96 of the cam 78 to disengage the first locking surfaces 58, 66 of the pawls 50, 52.

Continued rotation of the cam 78 in the direction (X) causes the hooks 92 of the cam 78 to engage the hooks 56, 64 of the pawls 50, 52, thereby applying a force on each pawl 50, 52 such that each pawl 50, 52 is moved in a direction generally towards the cam 78. Once the pawls 50, 52 are sufficiently moved toward the cam 78, the teeth 54, 62 of the respective pawls 50, 52 disengage the teeth 26 of the gear plate 18, thereby permitting relative rotation between the gear plate 18 and the guide plate 20. When relative rotation between the gear plate 18 and the guide plate 20 is permitted, the seatback 100 may be rotated relative to the seat bottom 102.

When the locking mechanism 14 is initially moved into the unlocked state such that the teeth 54, 62 of the pawls 50, 52 are disengaged from the teeth 26 of the gear plate 18, the gear plate 18 may be rotated relative to the guide plate 20 such that the post 70 disengages the recesses 42 of the control ring 22 and is permitted to move along an inner surface 104 of the control ring 22 (FIG. 5). Engagement between the post 70 of the second series of pawls 52 and the inner surface 104 of the control ring 22 maintains the second series of pawls 52 in an unlocked state and, as a result, prevents rotation of the cam 78 in the direction (W). Preventing rotation of the cam 78 in the direction (W) likewise prevents the first series of pawls 50 from being moved into the unlocked state and, as a result, maintains the locking mechanism 14 in the unlocked state.

Maintaining the locking mechanism 14 in the unlocked state permits relative movement between the gear plate 18 and the guide plate 20, and, thus, permits movement of the seatback 100 relative to the seat bottom 102. In one configuration, engagement between the post 70 and the inner surface 104 of the control ring 22 permits the seatback 100 to be "dumped" relative to the seat bottom 102 such that the seatback 100 is positioned substantially parallel to the seat bottom 102.

The pawls 50, 52 may be returned to the locked state only when the posts 70 are positioned relative to the recesses 42 of the control ring 22. At this point, movement of the pawls 50, 52 is permitted, as the recesses 42 provide a clearance for the posts 70 of the second series of pawls 52. Accordingly, when the force applied to the pivot 74 is released, the biasing member 76 is permitted to bias the cam 78 in the direction (W), which allows the first locking surface 94 and the second locking surface 96 to respectively apply a force to the second locking surfaces 60, 68 of the pawls 50, 52 and apply a force to the first locking surfaces 58, 66 of the pawls 50, 52. The force applied to the pawls 50, 52 at the first locking surfaces 58, 66 and the second locking surfaces 60, 68 causes the pawls 50, 52 to once again engage the teeth 26 of the gear plate 18, thereby returning the locking mechanism 14 to the locked state. When the locking mechanism 14 is in the locked state, relative rotation between the gear plate 18 and the guide plate 20 is restricted and, as a result, rotation of the seatback 100 relative to the seat bottom 102 is likewise restricted.

While the recesses 42 of the control ring 22 provide a clearance for the second series of pawls 52 to be moved into the locked state, the recesses 42 may apply a force on the post 70 when the locking mechanism 14 is initially moved into the unlocked state. Namely, when a force is applied to the pivot 74 such that the cam 78 is rotated in the direction (X) and the pawls 50, 52 are moved toward the cam 78, if the posts 70 of the second series of pawls 52 are not completely removed from the recesses 42 of the control ring 22, the control ring 22 may apply a force on the posts 70, thereby urging the pawls 52 in a direction toward the cam 78. The force exerted on the posts 70 of the second series of pawls 52 may be caused by the control ring 22 should a force be applied on the seatback 100 when the teeth 62 of the second series of pawls 52 initially disengage the teeth 26 of the gear plate 18. At this point, because the teeth 62 of the second series of pawls 52 are not engaged with the gear plate 18, the gear plate 18 may be rotated relative to the guide plate 20 and, as a result, the control ring 22 may be likewise rotated relative to the guide plate 20. Rotation of the control ring 22 relative to the guide plate 20 may cause the control ring 22 to engage the posts 70 of the second series of pawls 52 if the second series of pawls 52 are not sufficiently moved in a direction toward the cam 78.

In operation, when the locking mechanism 14 is initially moved into the unlocked state such that the teeth 54, 62 of the pawls 50, 52 disengage the teeth 26 of the gear plate 18, the first locking surfaces 58, 66 and the second locking surfaces 60, 68 of the pawls 50, 52, respectively, are disengaged from the second locking surfaces 96 and the first locking surfaces 94, respectively, of the cam 78. Disengaging the locking surfaces 58, 60, 66, 68 of the pawls 50, 52 from the locking surfaces 94, 96 of the cam 78 allows the pawls 50, 52 to backdrive the cam 78 in the direction (X) should the control ring 22 exert a force on the posts 70 of the second series of pawls 52.

Namely, the cam 78 may include a first reaction surface 106 disposed proximate to the first locking surface 94 and may include a second reaction surface 108 disposed proximate to the second locking surface 96. Because the locking surfaces 58, 60, 66, 68 of the pawls 50, 52 are disengaged from the locking surfaces 94, 96 of the cam 78 when the teeth 54, 62 of the pawls 50, 52 initially disengage the teeth 26 of the gear plate 18, should the control ring 22 exert a force on the posts 70 of the second series of pawls 52 and urge the second series of pawls 52 in a direction toward the cam 78, the pawls 50, 52 are not in contact with the first locking surface 94 and the second locking surface 96 but, rather, contact the reaction surfaces 106, 108. Contact between the pawls 50, 52 and the reaction surfaces 106, 108 causes the cam 78 to be moved in the direction (X), thereby allowing the pawls 50, 52 to backdrive the cam 78.

Allowing the pawls 50, 52 to backdrive the cam 78 prevents damage to the post 70 via the control ring 22. For example, if a force is applied to the post 70 via the control ring 22, movement of the pawls 52 in a direction toward the cam 78 is permitted by allowing the cam 78 to be backdriven in the direction (X) due to engagement between the pawls 50, 52 and the reaction surfaces 106, 108. Further, providing the reaction surfaces 106, 108 with a sloped surface facilitates engagement between the pawls 50, 52 and the cam 78 at the reaction surfaces 106, 108 to cause the cam 78 to rotate in the direction (X).

Permitting movement of the pawls 50, 52 in a direction toward the cam 78 when a force is exerted on the second series of pawls 52 due to engagement between the control ring 22 and the post 70 prevents damage to the post 70 by allowing the pawls 50, 52 to backdrive the cam 78 in the direction (X). Such movement of the cam 78 in the direction (X) would not be possible if the second locking surfaces 60, 68 were in contact with the first locking surfaces 94 or the first locking surfaces 58, 66 were in contact with the second locking surfaces 96. Allowing the second locking surfaces 60, 68 to disengage the first locking surfaces 94 and allowing the first locking surfaces 58, 60 to disengage the second locking surfaces 96 upon disengagement of the teeth 54, 62 from the teeth 26 of the gear plate 18 permits such rotation of the cam 78 in the direction (X).

As described, the post 70 of the second series of pawls 52 are protected when the teeth 54, 62 of the respective pawls 50, 52 are engaged with the teeth 26 of the gear plate 18, as rotation of the gear plate 18 relative to the guide plate 20 is restricted. The post 70 is likewise protected from being damaged by the control ring 22 when the teeth 54, 64 of the respective pawls 50, 52 are initially disengaged from the teeth 26 of the gear plate 18, as the locking surfaces 58, 60, 66, 68 of the pawls 50, 52, respectively, are disengaged from the locking surfaces 94, 96 of the cam 78. Such disengagement between the locking surfaces 58, 60, 66, 68 of the pawls 50, 52 from the locking surfaces 94, 96 of the cam 78 allows the pawls 50, 52 to be moved in a direction toward the cam 78 to move the cam 78 in the direction (X).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adjustment mechanism comprising:
   a first plate;
   a second plate rotatably attached to said first plate and including a first series of teeth arranged on a radiaally inner circumferential surface thereof;
   a locking mechanism operably supported by at least one of said first plate and said second plate and including a pawl having a second series of teeth on a radially outer circumferential surface thereof, a first hook portion and a post, said pawl movable radially between a locked position, an unlocked position, and an intermediate position between said locked position and said unlocked position, said second series of teeth in meshed engagement with said first series of teeth when said pawl is in said locked position to restrict relative rotation between said first plate and said second plate and disengaged from said first series of teeth in said unlocked position and in said intermediate position to permit relative rotation between said first plate and said second plate;
   a cam having a second hook portion and being rotatably supported between said first plate and said second plate and operable to move said pawl radially inwardly from said locked position to said unlocked position by rotational engagement of said second hook portion with said first hook portion; and
   a control ring fixed to he second plate and having an inner circumferential surface slidably receiving said post when said pawl is in said unlocked position and a recess formed in said inner circumferential surface for receiving said post when said pawl is in said locked position and when said pawl is in said intermediate position;
   wherein said pawl includes a first radially inward facing engagement surface and said cam includes a first radially outward facing locking surface, said first locking surface being in contact with said first engagement surface when said pawl is in said locked position and disengaged from said first engagement surface when said pawl is in said unlocked position or in said intermediate position; and further
   wherein said first locking surface is disengaged from said first engagement surface whenever said cam is rotated to a position where said second hook portion is engaged with said first hook portion.

2. The adjustment mechanism of claim 1, wherein said pawl includes a second radially inward facing engagement surface and said cam includes a second raially outward facing locking surface, said second locking surface in contact with said second engagement surface when said pawl is in said locked position and disengaged from said second engagement surface when said pawl is in said unlocked position or in said intermediate position.

3. The adjustment mechanism of claim 1, wherein said cam includes a first reaction surface disposed adjacent to said first locking surface, such that said first reaction surface is in contact with said pawl when said pawl is moved radially inwardly from said locked position to said intermediate position.

4. The adjustment mechanism of claim 3, wherein a rotational force applied to said second plate when said pawl is in said intermediate position forces radially inward movement of said pawl and engagement between said first reaction surface and said pawl causing said cam to rotate in an unlocking direction such that said first locking surface moves away from said first engagement surface.

5. The adjustment mechanism of claim 1, wherein engagement between said post and said inner circumferential surface restricts movement of said pawl in a radially outward direction toward said first series of teeth to maintain said pawl in said unlocked position.

6. The adjustment mechanism of claim 1, wherein said recess permits radially outward movement of said pawl toward said first series of teeth by providing clearance for said post to permit movement of said pawl from said unlocked position to said locked position.

* * * * *